Dec. 12, 1967        M. J. SCHAAB        3,357,339

AUTOMATIC COFFEE MAKER

Filed June 30, 1966

INVENTOR:
MICHAEL J. SCHAAB
BY Howson & Howson
ATTYS.

United States Patent Office 3,357,339
Patented Dec. 12, 1967

3,357,339
AUTOMATIC COFFEE MAKER
Michael J. Schaab, Mentor, Ohio, assignor to American Gas Association, Inc., New York, N.Y., a corporation of New York
Filed June 30, 1966, Ser. No. 561,954
10 Claims. (Cl. 99—283)

The present invention relates to automatic coffee makers and has particular application to coffee makers for use in institutions and commercial establishments where it is desirable to provide a coffee maker which makes coffee from ground coffee rapidly with a minimum loss of time and in accordance with the demand for the coffee.

Prior conventional coffee makers for commercial, institutional or domestic use are designed to brew a selected number of cups of coffee in a single operation. The brewing time for a large quantity of coffee is considerable and it is difficult, if not impossible, to brew a satisfactory cup of coffee without going through the entire coffee making cycle. In commercial establishments where the demand for coffee fluctuates considerably, during periods of light demand the coffee may stand for several hours between brews, whereas during peak demand periods the coffee must be brewed continuously. Coffee which has been brewed for several hours is less satisfactory than freshly brewed coffee and consequently, in order to maintain the quality of the coffee, commercial establishments frequently throw out quantities of coffee in order to have a fresh brew available at all times.

Furthermore, conventional coffee makers normally require the attention of a service attendant during the brewing period in order to insure proper brewing and to dispose of the spent grounds after completion of the brewing operation and to recharge the pot for the next brew.

Attempts have been made to reduce the attention required during the brewing operation, but such attempts have produced apparatus which is extremely bulky and expensive and is not entirely satisfactory.

With the foregoing in mind, the present invention provides an automatic coffee maker which brews coffee from ground coffee beans with a minimum loss of time and which brews coffee of a standard high quality in any desired quantity from a fractional part of a cup to a full pot or urn.

The present invention also provides a coffee maker which is of compact design and lends itself to complete portability.

Another object of the present invention is to provide a coffee maker which requires minimum attendance during the operation thereof and which automatically disposes of spent grounds and recharges itself in its normal operation.

Another object of the present invention is to provide a coffee maker which is susceptible of making coffee in accordance with the demand and which also makes hot water for tea or for diluting the coffee in an efficient and effective manner without disturbing the functioning of the coffee-making apparatus.

All of the objects of the invention are more fully set forth hereinafter with reference to the accompanying drawing wherein.

Figure 1:
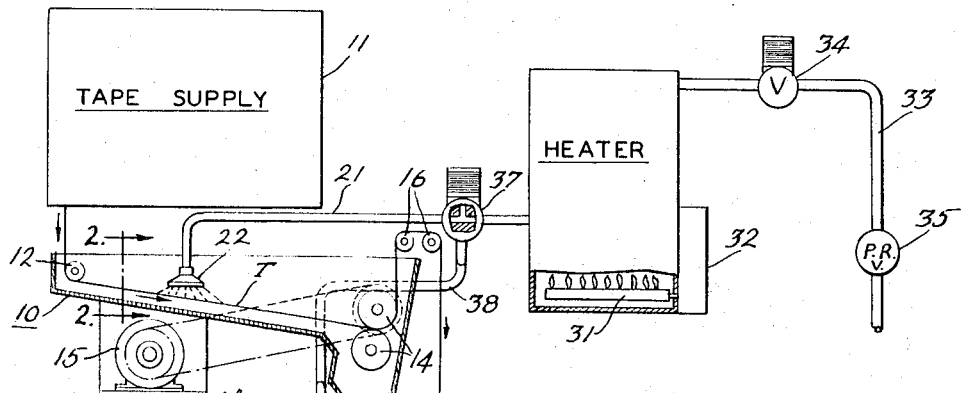
FIG. 1 is a diagrammatic representation of a coffee maker embodying the present invention.

Referring now to the drawing, the coffee is brewed by spraying hot water onto a carrier tape having ground coffee embodied therein. As the tape is advanced through the apparatus and water is sprayed thereon, the coffee brews and is discharged into a container such as a coffee pot, a cup, or an urn. During the coffee-making cycle, the water is supplied continuously and the tape is advanced continuously so that the water is passed into contact with fresh ground coffee at all times. The tape is highly absorbent so as to maintain a portion of the water in contact with the ground coffee therein during the brewing cycle, and squeeze rolls are provided to extract the brewed coffee from the tape prior to discharging the tape into a suitable receptacle. In accordance with the invention, a simplified control means effects a delay in the initial advance of the tape so as to permit saturation thereof with the water and furthermore provides a delay in the arrest of the tape after the water flow is arrested so as to advance the wet tape to the squeeze rolls prior to shut-down of the apparatus.

It has been found that if "drip grind" coffee is sandwiched between two 4½" wide strips of absorbent filter paper, an advance of the tape at a rate of 6.8" per minute will produce satisfactory coffee when water is sprayed onto the tape at 200° F. at the rate of 0.125 gallon per minute. The weight of the coffee per unit area of tape to produce a suitable strength for the brewed coffee is approximately 1 ounce per 40 square inches. The bottom layer of the filter paper is preferably heavy filter paper such as 16 pound paper and the top is very fine paper such as 11 pound paper which promotes water absorption through the top of the tape into intimate contact with the ground coffee. The rate of advance of the tape, the weight of the coffee per unit area of the tape, the water flow rate, etc., may be varied to accommodate to the requirements of the establishment where the coffee maker is utilized.

Referring now to the apparatus shown schematically in FIG. 1, a brewing chamber 10 is provided to receive a coffee carrier tape T from a tape supply chamber 11. Tape guide means 12 is provided at the entrance end of the chamber 10 and feed and squeeze rolls 14 are provided adjacent the exit end. The rolls 14 are driven by a motor 15 and operate to advance the tape T through the chamber and to extract brewed coffee therefrom. When using one-inch diameter soft rubber rolls five inches long, the operating pressure on the squeeze rolls is preferably approximately eight pounds. The spent tape is discharged from the chamber 10 over suitable guide means 16 into a trash receiver (not shown).

Figure 2:
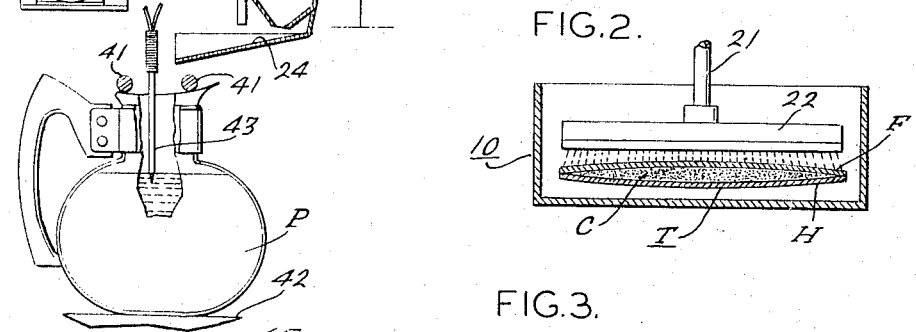
FIG. 2 is an enlarged sectional view taken on the line 2—2 of FIG. 1.

During its travel through the brewing chamber 10, at a moistening station the tape is sprayed with heated water supplied through a line 21 and a spray head 22. The spray head 22 delivers a fine spray of hot water across the full width of the tape T so as to thoroughly impregnate the tape and the coffee carried therein with hot water to effect saturation thereof and brew coffee by reason of its contact with the finely ground coffee incorporated in the tape. As shown in FIG. 2, the tape T comprises an upper layer of very fine paper F, a lower layer of heavy paper H, and an intermediate layer of ground coffee C. The fine paper F permits ready penetration of water through the paper F into the ground coffee C from which it is discharged through the heavy filter paper H into the bottom of the chamber 10, and out through a discharge spout 24, at least a portion of the water being absorbed by the tape and the ground coffee to saturate the same during its travel from the moistening station to the feed and squeeze rolls 14. The saturated carrier tape, as it is advanced through the chamber, enters between the nip of the squeeze rolls 14 which serve as an extracting station to extract the brewed coffee from the tape and the ground coffee and allow it to discharge through the discharge spout 24. Thus, as the tape is advanced through the brewing chamber 10, the water sprayed thereunto at the moistening station by the spray head 22 is utilized to continuously brew coffee of the desired strength.

The water to the line 21 is supplied from a water heater 31 which, in the present instance, is gas-fired and controlled as by controls 32 to maintain the water temperature at the desired level, such as 200° F. Water is supplied to the heater through a supply line 33 having a control valve 34 and pressure regulator 35 therein. When the valve is closed, water does not flow through the line 21, but when the valve 34 is open, water is forced through the line 21 to the spray head 22 and onto the coffee tape T.

In order to provide hot water for tea or for diluting the coffee, a bypass valve 37 is positioned in the line 21 from the heater 31. When the valve is actuated, the flow through the line 21 is interrupted and the flow, if the valve 34 is open, is directed through the bypass line 38 directly into the discharge spout 24.

As set forth more fully hereinafter, means is provided to interrupt the flow of the water or the coffee when the container is filled. As shown in FIG. 1, the container in this instance is a coffee pot P which is held against an abutment 41 surrounding the discharge spout 24 by means of a vertically-movable support 42. In operation, the container P is placed under the spout 24 and the support 42 is displaced upwardly to firmly engage the container against the abutment 41. The apparatus is then actuated to dispense either coffee or hot water and the liquid is dispensed until the water level in the container reaches a level-sensing probe 43 depending below the spout and disposed within the container. The probe actuates the controls of the apparatus to interrupt the flow of water. In this manner, the operation of the apparatus is fully automatic in that when the apparatus is actuated, it continues in operation until the container is filled.

During the brewing cycle, the tape moves continuously to the brewing chamber 10 to expose fresh tapes to the water being introduced into the chamber through the line 21 so that the coffee brewed in the chamber is continuously of the proper strength for serving. Thus, whether the container holds one cup or one hundred cups, the coffee received in the container at any time is of the proper strength. Since the probe interrupts the flow of liquid when the container is filled, the apparatus is fully effective to fill either a fractional cup or a multiple cup container.

Figure 3:
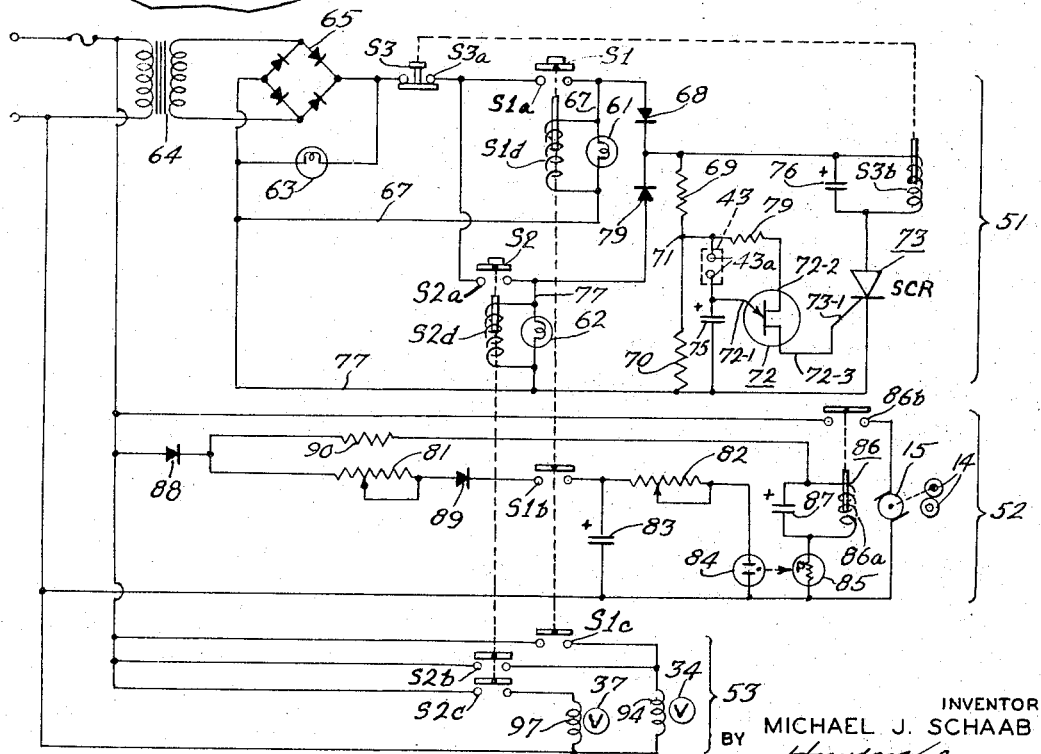
FIG. 3 is a circuit diagram illustrating controls for the coffee maker shown in FIG. 1.

Suitable controls for the apparatus are shown in the circuit diagram of FIG. 3. As shown, the circuit comprises a start-stop control circuit 51, a motor control circuit 52, and a valve control circuit 53. The manual controls for the circuit include a coffee pushbutton switch S1 having normally-open contacts S1a, S1b, and S1c and a holding coil S1d to maintain the contacts closed after pushing the switch S1. A hot water pushbutton switch S2 is provided having normally-open contacts S2a, S2b, and S2c and a holding coil S2d. A stop pushbutton switch S3 is provided having normally-closed contacts S3a. The switch S3 may be actuated manually, as by a pushbutton or may be actuated electrically by a relay coil S3b, as described hereinafter. The probe 43 is also included in the start-stop circuit 51 as indicated at 43 and consists of a pair of normally-open contacts 43a adapted to be closed when the probe is engaged by the liquid in the container P. The start-stop circuit also includes indicator lights 61, 62, and 63. The light 61 is illuminated when the switch S1 is closed; the light 62 is illuminated when the switch S2 is closed, and the light 63 is illuminated when the circuit is energized and in operating condition. The circuit 51 is normally energized through a transformer 64 and a rectifying bridge 65 from a conventional AC power source. When the circuit is energized, the light 63 is illuminated and the remainder of the circuit 51 is in condition to be energized when either of the normally open switches S1 or S2 is operated to closed position.

When the coffee switch S1 is closed, the holding coil S1d and the indicator light 61 are energized through leads 67, 67. Current also flows through the diode 68 and voltage dividing resistors 69 and 70, which, in conjunction with the probe 43, control a uni-junction transistor 72 and an SCR 73. The uni-junction transistor 72 is of the well known type having an emitter electrode 72–1, a second base electrode 72–2, and a first base electrode 72–3. A dropping resistor 79 connected to the junction point 71 of the resistors 69 and 70, biases second base 72–2 positive with respect to first base 72–3, but, in the absence of a source of current for emitter 72–1, the current flowing outwardly from first base electrode 72–3 in response to the voltage of second base electrode 72–2 is relatively low and insufficient, when supplied to the gate electrode 73–1 of SCR 73, to render the latter device conductive. Closure of the switch S1 also actuates the motor control circuit 52 and valve control circuit 53 as described below.

The switch S1 remains closed until the switch S3 is opened manually or until the level of the water or coffee in the container P rises to the probe 43, at which time the pair of contacts 43a within the probe structure are effectively short circuited. A capacitor 75 receives and stores current passing through the probe contacts 43a from the junction point 71 to provide the emitter 72–1 of the uni-junction transistor 72 with a sufficiently positive trigger voltage to turn on the uni-junction transistor 72 and produce a series of pulses of high current at the first base electrode 72–3 while the probe contacts 43a are closed. The pulses of current fire the SCR 73 in accordance with the firing frequency of the relaxation oscillator circuit comprised of the capacitor 75 and the uni-junction transistor 72, which, in turn, allows sufficient current flow to the relay coil S3b to energize the relay and automatically open the switch S3. The capacitor 76 acts to smooth irregularities in the SCR firing frequency and maintains the relay coil S3b energized. Whether opened manually or automatically, the switch S3 opens the contacts S3a to remove voltage from the junction point 71, from the relay coil S3b and the SCR 73, and from the holding coil S1d, permitting the switch S1 to open the contacts S1a, S1b, and S1c.

When the hot water switch S2 is actuated to close the contacts S2a, S2b, and S2c, the holding coil S2d and the indicator light 62 are energized through the leads 77. Closure of the contacts S2a also causes current flow through the voltage dividing resistors 69 and 70 through a diode 79. The SCR transistor 73 remains substantially non-conductive as described above. The contacts S2b and S2c of the switch S1 control the valve circuit 53 as described hereinafter.

The switch S2 remains closed until the probe 43 is immersed in liquid to effectively close the contacts 43a and energize the relay coil S3b, and automatically open the switch S3 or until the stop button is operated to manually open the switch S3, as described above.

In accordance with one feature of the invention, the motor control circuit 52 operates to advance the tape T continuously duirng the time when the coffee switch S1 is actuated, time delay means being provided to defer initiation of the advance of the tape for a predetermined time delay after actuation of the switch S1 and to defer interruption of the advance of the tape for a predetermined time delay after opening of the switch S1. To this end, the motor control circuit 52 includes the switch contacts S1b, adjustable resistances 81 and 82, a time-control capacitor 83, a glow discharge tube 84, a photo-conductive cell 85 coupled to the glow tube 84 to be rendered conductive upon ignition of the glow tube, and a motor control relay 86 and its associated filter or smoothing capacitor 87. Diodes are provided at 88 and 89 to provide half-wave rectification to the current supplied to the motor control circuit 52.

In operation of the circuit 52, when the contacts S1b are closed by the switch S1, a charging current is supplied to the capacitor 83 through the variable resistance 81 which is preset to provide the desired time delay. After the desired time delay, the voltage on the capacitor is built up sufficiently to ignite the glow tube 84 which thereupon renders photo cell 85 conductive, permitting current flow through the coil 86a of the relay 86, closing the contacts 86b thereof and energizing the motor 15 to drive the feed and squeeze rolls 14. Thus, the rolls 14 advance the tape after the time delay which is determined by the setting of the potentiometer 81 to permit the tape to become thoroughly moistened before it is advanced beyond the moistening station.

When the switch S1 is opened, either by the pressing of the stop button S3 or the operation of the relay coil S3d, the contacts S1b open and the capacitor 83 discharges through the adjustable resistance 82 to maintain the glow tube 84 energized for a predetermined time period, depending upon the setting of the potentiometer 82. Upon discharge of the capacitor 83, to a level sufficient to extinguish the glow tube 84, the photo cell 85 is rendered nonconductive to interrupt energization of the coil 86a of the relay 86, thereby opening the contacts 86b and arresting the motor 15. The setting of the potentiometer 82 is preferably correlated to the rate of advance of the carrier tape T, so that, following opening of the switch S1, the tape T is advanced for a time period sufficient to advance the moistened tape from the moistening station into the feed and squeeze rollers 14 at the extracting station. In this way, the motor control circuit 52 provides a single time-control capacitor which in an efficient and effective manner provides the desired time delay in both the initiation and the arrest of the movement of the tape T through the brewing chamber 10.

The valve control circuits 53 are controlled by the switches S1 and S2 to open the valve 34 when either of the switches S1 and S2 is closed and to additionally operate the valve 37 when the switch S2 is closed. To this end, as shown, the contacts S1c and S2b are connected in parallel to energize the solenoid 94 of the valve 34. When either switch is closed, the solenoid is energized to open the valve 34, initiating flow through the valves 34 and 37. Likewise, when the closed switch is again opened, the solenoid 94 is de-energized to close the valve 34, thereby shutting off the flow of water.

When the coffee switch S1 is closed, the water flows through the valve 37 to the coffee water line 21 into the brewing chamber 10 to brew coffee. On the other hand, when the switch S2 is closed, the contacts 82c complete a circuit to the solenoid 97 of the valve 37 to divert the flow from the coffee supply line 21 to the by-pass line 38, thereby bypassing the brewing chamber 10 and discharging the heated water directly into the discharge nozzle 24. When the switch S2 is again opened, the solenoid 97 is de-energized, permitting the valve 37 to return to the position shown in FIG. 1 so as to direct the water through the coffee supply line 21.

Without limiting the disclosurer to these values, typical values for the various components may be as follows:

| | |
|---|---|
| Holding coils S1d and S2d | —24 volts. |
| Relay coil S3b | —500 ohms 20 ma. |
| Relay coil 86a | 2500 ohms 10 ma. |
| Lights 61, 62 and 63 | —24 volts. |
| Transformer 64 | 110 v. AC to 24 v. AC 2 amp. |
| Diodes 68, 78 and for bridge 65 | IN 3253. |
| Diodes 88 and 89 | IN 3254. |
| Resistors 69 and 70 | 1K ohms ½ watt. |
| Resistor 79 | 680 ohms ½ watt. |
| Resistor 90 | 10K ohms 1 watt. |
| Locking potentiometer 81 | 100K ohms 2 watt. |
| Locking potentiometer 82 | 1.0M ohms 2 watt. |
| Capacitor 75 | 0.1 mfd. 50 v. DC. |
| Capacitors 76 and 87 | 4 mfd. 250 v. DC. |
| Capacitor 83 | 130 mfd. 250 v. DC. |
| Uni-junction transistor 72 | 2N1160 |
| SCR | 2N3528. |
| Glow tube 84 | Ne–76. |
| Photo conductive cell 85 | Delco LDR–25. |

Thus, the valve control circuit provides a simple and effective means of providing for dispensing any desired quantity of either coffee or hot water, as demanded by the operation of the switches S1 or S2. The continuous layer of coffee on the carrier tape in conjunction with the continuous advance of the tape during the brewing cycle insures a continuous supply of coffee at the desired strength in any desired quantity. The apparatus may also be used for making other liquids which are brewed by passing water or the like over solid material. For example, the apparatus may brew tea by disposing tea leaves in the carrier tape in place of the ground coffee.

While a particular embodiment of the present invention has been herein illustrated and described, it is not intended to limit the invention to such disclosure, but changes and modifications may be made therein and thereto within the scope of the following claims.

What is claimed is:

1. Apparatus for brewing coffee from ground coffee disposed in a continuous uniform layer of predetermined width within an absorbent porous carrier of indeterminant length, comprising a brewing chamber having a moistening station, an extracting station, and a discharge spout, feed means to advance said carrier continuously through said stations in the chamber, spray means at said moistening station to continuously direct hot water into contact with the coffee layer in said carrier across its full width as it is advanced therethrough, at least a portion of said water being absorbed by said coffee-laden carrier and retained in brewing contact with said ground coffee to make liquid coffee during its travel from said moistening station to said extracting station, said extracting station being operable to extract the liquid coffee from said carrier and direct the coffee into the discharge spout.

2. Apparatus according to claim 1 including first switch means to initiate operation of said feed means and said spray means, and second switch means to arrest operation of said feed means and said spray means.

3. Apparatus according to claim 2 including time delay means operable upon actuation of said first switch means to effect a delay in the initiation of said feed means relative to said spray means and operable upon actuation of said second switch means to effect a delay in the arrest of said feed means relative to said spray means.

4. Apparatus according to claim 3 wherein said time delay means comprises a time-control capacitor operable when charged to effect operation of said feed means and when discharged to arrest operation thereof, said first switch means operable to initiate charging of said capacitor at a selected rate simultaneously with initiation of said spray means, said second switch means operable to initiate discharging of said capacitor at a selected rate simultaneously with arrest of said spray means, said selected discharge rate being correlated with the rate of advance of said carrier to afford advance of the carrier from said moistening station to said extracting station after arrest of said spray means.

5. Apparatus according to claim 2 wherein said second switch means is operable either automatically upon the filling of a container or manually, said apparatus means including a level-sensing means operable to be disposed within the container, and connections between said level sensing means and said second switch means operable upon filling of the container to actuate said second switch means.

6. Apparatus according to claim 5 wherein said level sensing means comprises normally open contacts operable to be effectively closed upon filling of the container, said connections including a relay coil operable when energized to operate said second switch means, said contacts when effectively closed being operable to energize said coil.

7. Apparatus according to claim 2 wherein said spray means includes a spray head at said moistening station, a supply line to deliver hot water to said spray head, and a valve to initiate and arrest the flow of hot water to said supply line, and connections from switch means to said valve.

8. Apparatus according to claim 7 including a bypass line connected between said supply line and said discharge spout, a second valve to divert the hot water from said spray head to said bypass line, and a third switch means operable to activate said first and second valves without operating said feed means, to thereby discharge heated water from said spout, said second switch means being operable to de-activate said first and second valves.

9. Apparatus according to claim 1 wherein said carrier comprises a tape composed of two layers of filter paper having said layer of ground coffee therebetween, said extracting station including a pair of squeeze rolls having a nip through which said carrier tape is advanced to thereby extract the liquid coffee therefrom.

10. Apparatus according to claim 9 wherein said feed means includes a drive motor for said squeeze rolls to drive said rolls at a predetermined rate of advance whereby said rolls comprise feed and squeeze rolls for said tape.

References Cited

UNITED STATES PATENTS

| | | | |
|---|---|---|---|
| 2,639,078 | 5/1953 | Karlen | 99—283 |
| 3,229,612 | 1/1966 | Brown | 99—289 X |
| 3,327,613 | 6/1967 | Davis | 99—289 X |
| 3,327,614 | 6/1967 | Bridges et al. | 99—289 X |
| 3,327,615 | 6/1967 | Swan | 99—289 X |

WILLIAM I. PRICE, *Primary Examiner.*